(12) United States Patent
Coley et al.

(10) Patent No.: US 8,385,087 B2
(45) Date of Patent: Feb. 26, 2013

(54) EXTENDING ACHIEVABLE DUTY CYCLE RANGE IN DC/DC FORWARD CONVERTER WITH ACTIVE CLAMP RESET

(75) Inventors: William Hall Coley, Cary, NC (US); Charles Edward Hawkes, Cary, NC (US)

(73) Assignee: Linear Technology Corporation, Milpitas, CA (US)

( * ) Notice: Subject to any disclaimer, the term of this patent is extended or adjusted under 35 U.S.C. 154(b) by 381 days.

(21) Appl. No.: 12/880,618

(22) Filed: Sep. 13, 2010

(65) Prior Publication Data

US 2011/0062782 A1 Mar. 17, 2011

Related U.S. Application Data

(60) Provisional application No. 61/243,233, filed on Sep. 17, 2009.

(51) Int. Cl.
*H02M 3/335* (2006.01)
(52) U.S. Cl. ...................... 363/21.11; 363/21.06; 363/97
(58) Field of Classification Search ............... 363/21.04, 363/21.05, 21.06, 21.1, 21.11, 97
See application file for complete search history.

(56) References Cited

U.S. PATENT DOCUMENTS

| | | | |
|---|---|---|---|
| 5,742,491 A | | 4/1998 | Bowman et al. |
| 5,805,434 A | * | 9/1998 | Vinciarelli et al. ............. 363/16 |
| 5,973,939 A | * | 10/1999 | Tan ............................ 363/21.06 |
| 7,911,812 B2 | * | 3/2011 | Colbeck et al. ............ 363/21.02 |
| 7,944,085 B2 | * | 5/2011 | Kyono ............................ 307/31 |
| 2005/0046404 A1 | | 3/2005 | Uusitalo |
| 2006/0171177 A1 | | 8/2006 | Asao |
| 2007/0115699 A1 | | 5/2007 | Yang |

OTHER PUBLICATIONS

European Search Report issued in European Patent Application No. 10009841.7-2207, mailed Dec. 3, 2010.

* cited by examiner

*Primary Examiner* — Jeffrey Sterrett
(74) *Attorney, Agent, or Firm* — McDermott Will & Emery LLP

(57) ABSTRACT

Novel system and methodology are provided for controlling a DC/DC forward converter having a transformer with primary and secondary windings, a reset switch, and a first switch coupled to the primary winding of the transformer. The control system involves a PWM control circuit responsive to an output signal of the converter for producing a PWM signal to control switching of the reset switch, and the first switch. A period of the PWM signal includes an on-time interval for enabling transfer of power via the transformer when the first switch is on, and a reset time interval for enabling reset of the transformer when the reset switch is on. A maximum value of the on-time interval is pre-set to provide sufficient time for the reset. The reset switch is turned off when the PWM signal goes from a first level to a second level. A first delay period is set between time when the reset switch turns off and time when the first switch turns on. A first delay control circuit is provided for reducing the first delay time when the on-time interval approaches the maximum value. Further, the converter may include a second switch coupled to the secondary winding of the transformer. A second delay period shorter than the first delay period may be set between time when the reset switch turns off and time when the second switch turns on. A second delay control circuit may be provided for reducing the second delay period when the on-time interval approaches the maximum value.

17 Claims, 5 Drawing Sheets

BACKGROUND

BACKGROUND

EXTENDING ACHIEVABLE DUTY CYCLE RANGE IN DC/DC FORWARD CONVERTER WITH ACTIVE CLAMP RESET

This application claims priority of provisional U.S. patent application Ser. No. 61/243,233 filed on Sep. 17, 2009 and entitled "METHOD FOR EXTENDING ACHIEVABLE DUTY CYCLE RANGE IN DC/DC FORWARD CONVERTER WITH ACTIVE CLAMP RESET."

TECHNICAL FIELD

This disclosure relates to power supply systems, and more particularly, to circuitry and methodology for controlling a DC/DC forward converter with active clamp reset.

BACKGROUND ART

A DC/DC forward converter uses transformer windings to provide voltage conversion and galvanic isolation for the load. Power converters based on a forward topology are generally more efficient than flyback converters. By contrast with a flyback converter that stores energy as a magnetic field in the inductor when the switching element is conducting, a forward converter does not store energy in the transformer during the conduction time of the switching element. Instead, energy is passed to the output of the forward converter directly by transformer action during the switch conduction phase. The operation of the transformer in a forward topology doesn't inherently self-reset each power switching cycle. The transformer in a forward converter requires the application of a mechanism to reset the transformer each power cycle. The active clamp reset mechanism is presently finding extensive use.

FIG. 1 illustrates a conventional DC/DC forward converter 10 with an active clamp reset that converts an input voltage Vin into an output voltage Vout that may be higher or lower than the input voltage Vin. The converter 10 includes a power transformer PT having primary and secondary windings. The primary side and secondary side of the transformer PT may or may not be on opposite sides of an isolation barrier (i.e. referenced to independent grounds). A primary gate PG and an active clamp gate AG are arranged on the primary side of the transformer PT. A forward gate FG and a synchronous gate SG are provided on the secondary side of the transformer PT. The AG, FG and SG may be N-type MOSFETs, whereas the AG may be a P-type MOSFET.

The converter 10 further includes a clamp capacitor $C_C$ arranged on the primary side of the transformer PT, and an inductor L and an output capacitor $C_{OUT}$ coupled on the secondary side of the transformer PT. The active clamp gate AG is controlled using a level shift circuit including a capacitor $C_1$, a Schottky diode D and a resistor R.

FIG. 2 shows timing diagrams that illustrate operation of the forward converter 10. A switching period of the forward converter 10 is defined by the period of a pulse width modulation (PWM) signal that controls switching of the AG, PG, FG and SG in the forward converter 10. The PWM period is composed of the on-time $t_{ON}$, and the core reset time required to reset the magnetic flux in the transformer core. The reset is performed when the AG is on. When the PWM signal goes high, the AG is turned off as represented by the rising edge on the AG timing diagram. In a DC/DC Forward Converter with Active Clamp Reset, it is commonly known that setting a delay between the turn-off of the AG and the turn-on of the PG decreases power loss due to switching the PG with lower drain-source voltage. To minimize power loss, the PG is turned on only after the potential at the SWP node coupled to the drain of the PG falls from a voltage of Vin/(1−D) to the input voltage Vin, where D is a duty cycle of the converter 10. The Vin/(1−D) voltage corresponds to the voltage at the fully charged clamp capacitor $C_C$. The time for the potential at the SWP node to fall is a function of the magnetizing current of the power transformer PT and the capacitance of the PG and AG, and generally is in the range from 200 ns to 1 μs.

On the secondary side, the FG is turned on also after a delay. The SG and the FG are configured as make-before-break, so the SG is on (a high level on the SG timing diagram) until the FG turns on. After the FG turns on (the rising edge on the FG timing diagram), the SG turns off (the falling edge on the SG timing diagram). If the FG and the SG switch immediately when the AG turns off, significant power will be lost in the body diode of the SG. If the FG and the SG switch after the PG turns on, then the SG and the PG will be cross-conducting and will lose power due to shoot-through. Therefore, the FG delay from the time when the AG turns off to the time when the FG turns on must be shorter than the PG delay from the time when the AG turns off to the time when the PG turns on, but not short enough to lose significant power in the body diode of the SG.

As indicated above, the PG delay can be up to 1 μs in some cases. While this delay is good for efficiency, power is not transferred from the primary side to the secondary side during this time. Therefore, the PG delay limits the maximum achievable duty cycle of the converter 10. Generally, in single switch forward converters, the duty cycle is already limited to between 65% and 80% to allow sufficient "off" time for the active clamp to reset the magnetic flux in the transformer core. The extra delay before turning on the PG further reduces this duty cycle. With a common switching frequency of 200 kHz, the maximum achievable duty cycle could be lower than 50% for a 1 μs delay. The need for higher duty cycles in active clamp reset forward converters is becoming more common as input ranges are extending from a ratio of 1:2 for a 36V-72V system to 1:4 for a 9V-36V system, or even higher.

If the system requires a wide input range, the design can usually be modified to be made to work. However, there is a huge compromise in component selection. For example, consider a 9V-36V system with a 200 kHz switching frequency, 1 μs delay, and 70% maximum duty cycle. In this case, the maximum achievable duty cycle is 50%. Therefore, the transformer turns ratio could be selected such that when Vin is 9V a 50% or lower duty cycle can be achieved. This will result in a non-optimal turns ratio for power loss in the transformer. Additionally, this higher turns ratio presents higher voltage stress on the MOSFETs, particularly when Vin is 36V.

A competent power supply designer would not choose the turns ratio based on the 1 μs delay setting, as it would cause more power loss than it saves. Therefore, the designer would simply reduce the delay setting to achieve the required duty cycle, and the power loss due to switching the PG would not be minimized.

Hence, there is a need for a technique that would allow the achievable duty cycle of a forward converter with an active clamp reset to be extended so as to minimize power loss.

SUMMARY OF THE DISCLOSURE

The present disclosure offers a novel system and methodology for controlling a DC/DC forward converter with active clamp reset. In accordance with one aspect of the disclosure, a system is configured for controlling a DC/DC forward converter having a transformer with primary and secondary windings, a reset switch, and a first switch coupled to the primary winding of the transformer. The control system comprises a PWM control circuit responsive to an output signal of the converter for producing a PWM signal to control switching of the reset switch and the first switch. A period of the PWM signal includes an on-time interval for enabling transfer of power via the transformer when the first switch is on, and a reset time interval for enabling reset of the transformer when the reset switch is on. A maximum value of the on-time interval is pre-set to provide sufficient time for the reset. The reset switch is turned off when the PWM signal goes from a first level to a second level. A first delay period is set between time when the reset switch turns off and time when the first switch turns on. A first delay control circuit is provided for reducing the first delay period when the on-time interval approaches the maximum value.

Further, the converter may include a second switch coupled to the secondary winding of the transformer. A second delay period shorter than the first delay period may be set between the time when the reset switch turns off and the time when the second switch turns on. A second delay control circuit may be provided for reducing the second delay period when the on-time interval approaches the maximum value.

The first delay control circuit may be configured to determine a difference $\Delta t$ between duration of the on-time interval and the maximum value of the on-time interval, and to reduce the first delay period to a value of $(m \times \Delta t)$ if the value of $(m \times \Delta t)$ is less the first delay period, where m is a constant value selected to provide stability of converter operations.

The second delay control circuit may be configured to determine the difference $\Delta t$ between duration of the on-time interval and the maximum value of the on-time interval, and to reduce the second delay period to a value of $(k \times \Delta t)$, if the value of $(k \times \Delta t)$ is less than the second delay period, where k is a constant value selected to provide stability of converter operations, and m exceeds k.

For example, the first delay control circuit may include a first timing capacitor, a first current source for producing a first value of current representing the first delay period, and a second current source for producing a second value of current proportional to the first value. The first timing capacitor may be coupled to the first and second current sources so as to be charged with current of the first value and discharged with current of the second value.

Also, the first delay control circuit may include a comparator for comparing voltage at the first timing capacitor with a threshold value to control charging of the first timing capacitor. The first timing capacitor may be disconnected from the first current source when the voltage at the first timing capacitor reaches the threshold value.

The first timing capacitor may be connected to the first current source for charging when the PWM signal goes to the second level, and may be connected to the second current source for discharging when the PWM signal goes to the first level. The first timing capacitor may be disconnected from the second current source in response to the maximum value of the on-time interval.

Similarly, the second delay control circuit may include a second timing capacitor, a third current source for producing a third value of current representing the second delay period, and a fourth current source for producing a fourth value of current proportional to the third value, where the fourth value is higher than the second value. The second timing capacitor may be coupled to the third and fourth current sources so as to be charged with current of the third value and discharged with current of the fourth value.

In accordance with another aspect of the disclosure, a duty cycle range is extended in a DC/DC forward comparator having a transformer with primary and secondary windings, a reset switch, and a first switch coupled to the primary winding of the transformer. The duty cycle range extension method involves the step of producing a PWM signal to control switching of the reset switch and the first switch, based on an output signal of the converter. A period of the PWM signal includes an on-time interval for enabling transfer of power via the transformer when the first switch is on, and a reset time interval for enabling reset of the transformer when the reset switch is on. A maximum value of the on-time interval is pre-set to provide sufficient time for the reset. The reset switch is turned off when the PWM signal goes from a first level to a second level. A first delay period is set to delay turn-on of the first switch after the reset switch turns off, thereby reducing a duty cycle of the converter. The first delay period is reduced when the on-time interval approaches the maximum value, so as to extend the duty cycle.

Also, the converter may include a second switch coupled to the secondary winding of the transformer. A second delay period shorter than the first delay period may be set to delay turn-on of the second switch after the reset switch turns off. The second delay period may be reduced when the on-time interval approaches the maximum value, so as to further extend the duty cycle.

The step of reducing the first delay period may comprise:
in a first switching cycle of the converter, determining a difference $\Delta t$ between duration of the on-time interval and the maximum value of the on-time interval, and in a second switching cycle of the converter carried out after the first switching cycle, reducing the first delay period to a value of $(m \times \Delta t)$ if the value of $(m \times \Delta t)$ is less the first delay period, where m is a constant value selected to provide stability of converter operations.

The step of reducing the second delay period may comprise:
in a first switching cycle of the converter, determining a difference $\Delta t$ between duration of the on-time interval and the maximum value of the on-time interval, and in a second switching cycle of the converter carried out after the first switching cycle, reducing the second delay period to a value of $(k \times \Delta t)$, if the value of $(k \times \Delta t)$ is less than the second delay period, where k is a constant value selected to provide stability of converter operations, and m exceeds k.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using an example of a peak current mode control in a forward converter with active clamp reset. It will become apparent, however, that the concepts described herein are applicable to any method of controlling a forward converter with active clamp reset.

Figure 1:
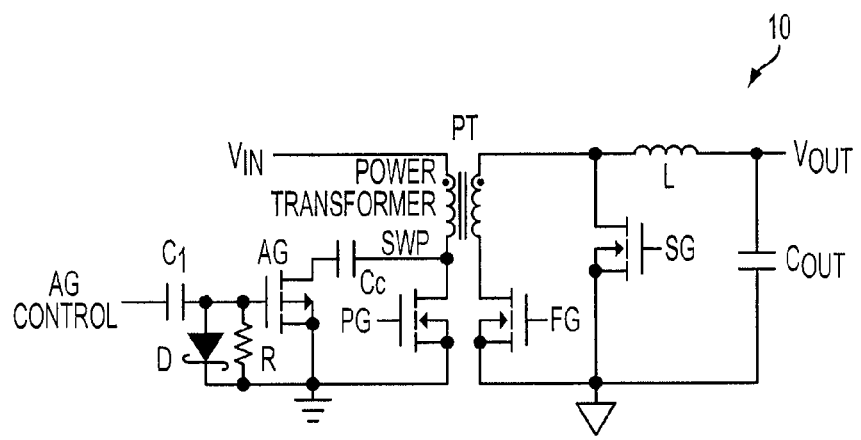
FIG. 1 is a diagram illustrating a typical arrangement of a DC/DC forward converter with active clamp reset.
Figure 2:
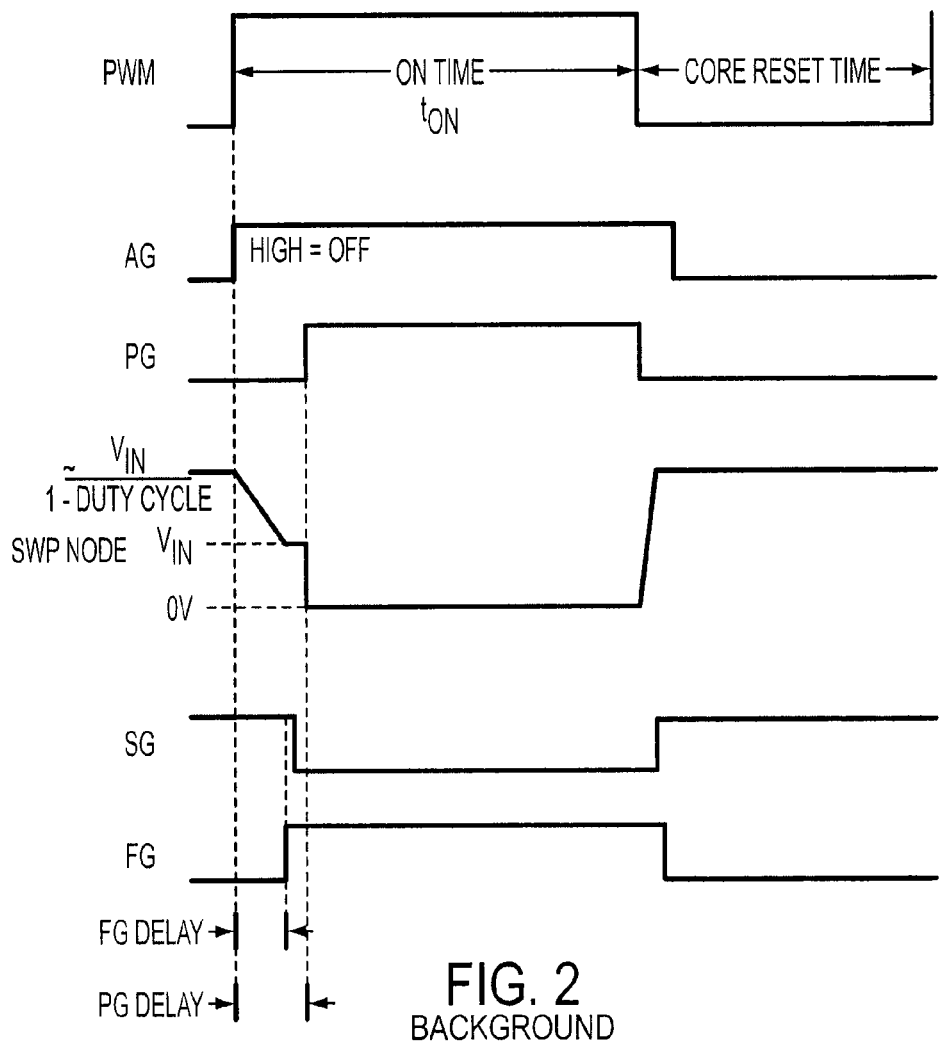
FIG. 2 shows timing diagrams that illustrate switching of the gates in the DC/DC forward converter with active clamp reset.
Figure 3:
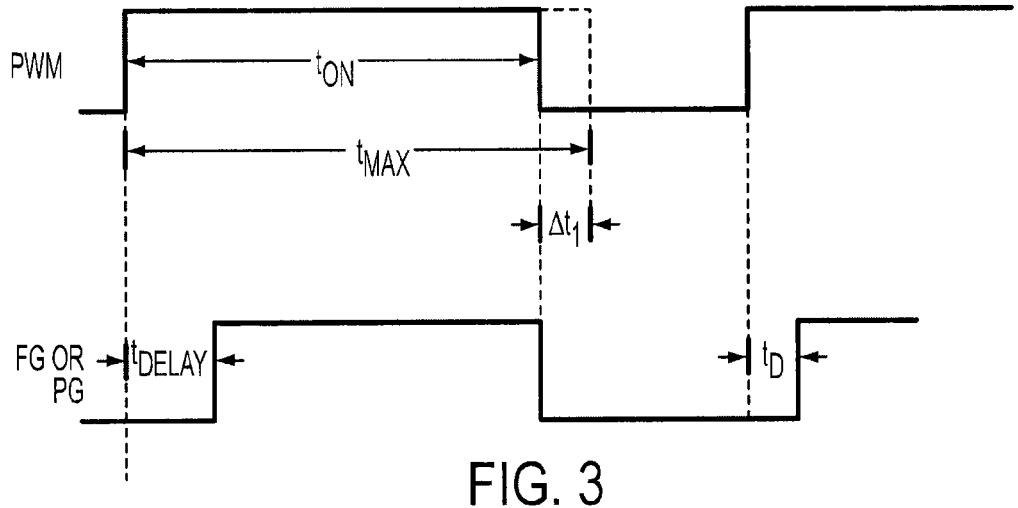
FIG. 3 shows timing diagrams that illustrate the concept of the duty cycle range extension in accordance with the present disclosure.

FIG. 3 illustrates the concept of extending achievable duty cycle of a forward converter with active clamp reset in accordance with the present disclosure. The on-time $t_{ON}$ in FIG. 3 indicates an actual on-time of a PWM control signal in a current cycle of the converter. The maximum on-time $t_{MAX}$ defines the maximum on-time value of the PWM control signal to provide sufficient core reset time to reset the transformer. Further, the user may program the respective delay time $t_{DELAY}$ that defines a delay from the time when the active clamp gate AG turns off to the time when the primary gate PG or the forward gate FG turns on.

As the on-time $t_{ON}$ of the PWM control signal in a current switching cycle approaches the maximum on-time value $t_{MAX}$, the difference between these two time intervals is measured as $\Delta t_1 = t_{MAX} - t_{ON}$. For the next switching cycle, the delay time $t_D$ between turning off of the AG and turning on of the PG or FG is then set equal to the lesser of $t_{DELAY}$ and $k*\Delta t_1$, where k is a constant value selected to guarantee stability of the converter operation. For example, k may be in the range from 0.9 to 1.1. In the cycle, in which the on-time $t_{ON}$ becomes equal to the maximum on-time $t_{MAX}$, the delay time $t_D$ is equal to zero, and the full maximum duty cycle is achieved.

Figure 4:
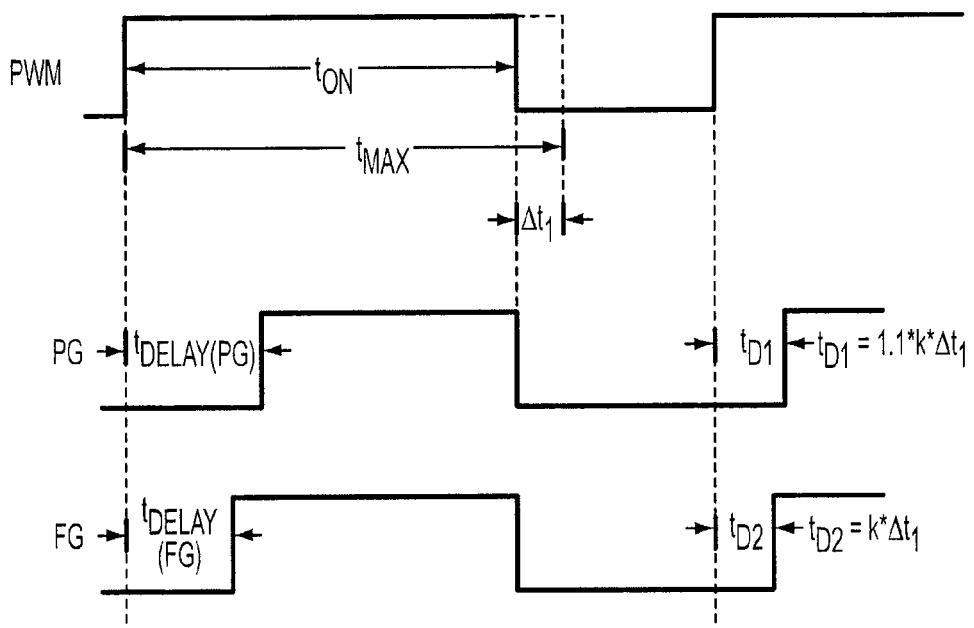
FIG. 4 illustrates relative timing between switching of the primary gate (PG) and the forward gate (FG) in accordance with the present disclosure.

In a forward converter with active clamp reset, the synchronous gate SG must turn off before the primary gate PG turns on to avoid shoot through. The forward gate FG and the synchronous gate SG are make-before-break, so the FG must turn on before the PG turns on. Therefore, as shown in FIG. 4, the delay time $t_{DELAY(FG)}$ before the FG turns on must be less than the delay time $t_{DELAY(PG)}$ before the PG turns on, to avoid shoot-through. If only the PG delay were reduced as $t_{ON}$ approaches $t_{MAX}$, then the PG would turn on before the FG, and the SG and PG shoot-through would occur. Thus, the FG delay must also be reduced as $t_{ON}$ approaches $t_{MAX}$. Furthermore, if the FG and the PG delays were limited to the same value $\Delta t_1 = t_{MAX} - t_{ON}$, then the FG and the PG would be transitioning at the same time, which may cause shoot-through due to propagation delays and rise times. As shown in FIG. 4, to avoid this problem, the reduced delay time $t_{D1}$ for the PG may be made longer than the reduced delay time $t_{D2}$ for the FG. For example, the PG delay time $t_{D1}$ may be equal to 1.1*k*$\Delta t_1$ when the FG delay time $t_{D2}$ is k*$\Delta t_1$. In this manner, the PG delay time will be 10% longer than the FG delay time as $t_{ON}$ approaches $t_{MAX}$.

Figure 5:
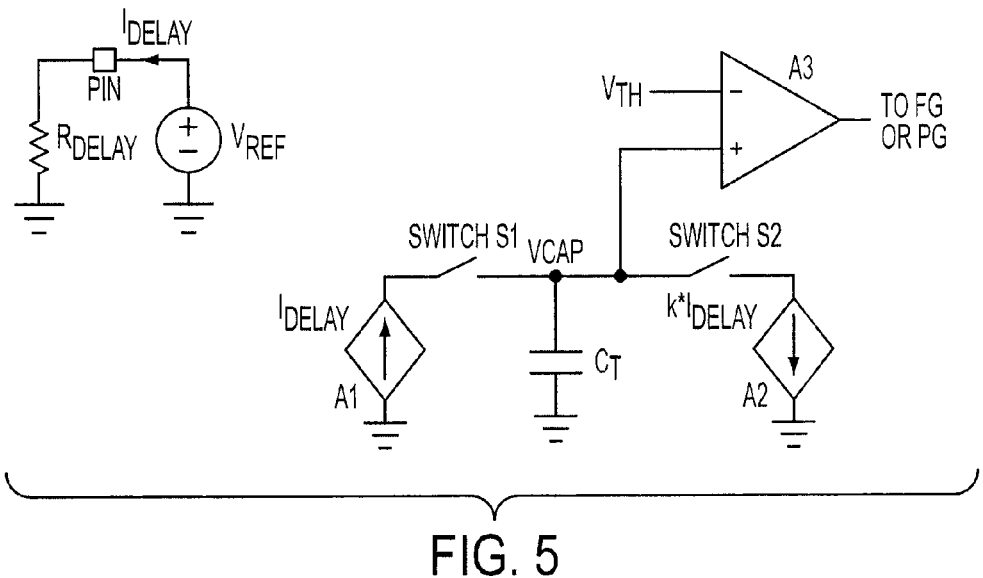
FIG. 5 schematically illustrates an exemplary embodiment of the duty cycle range extension in accordance with the present disclosure.

FIG. 5 that schematically illustrates the concept of extending achievable duty cycle in accordance with the present disclosure, shows a pin (PIN) of the converter controller IC that sets the delay time $t_{DELAY}$ programmable by the user. The delay time $t_{DELAY}$ may be set using a resistor $R_{DELAY}$, value of which is selected by the user. The resistor $R_{DELAY}$ defines the value of the delay current $I_{DELAY}$ that flows between a reference voltage source $V_{REF}$ and the pin. As shown in more detail later, the user-programmable delay time $t_{DELAY}$ is reduced using a circuit including current sources A1 and A2 coupled to a timing capacitor $C_T$ via switches S1 and S2, and a delay comparator A3 that compares the capacitor voltage VCAP (voltage at the node VCAP shown in FIG. 5) with a threshold voltage $V_{TH}$. The switch S1 is closed when the PWM signal goes high, and is opened in response to an output signal of the comparator. The switch S2 is closed when the PWM signal goes low, and is open when the maximum on-time $t_{MAX}$ is reached.

Figure 6:
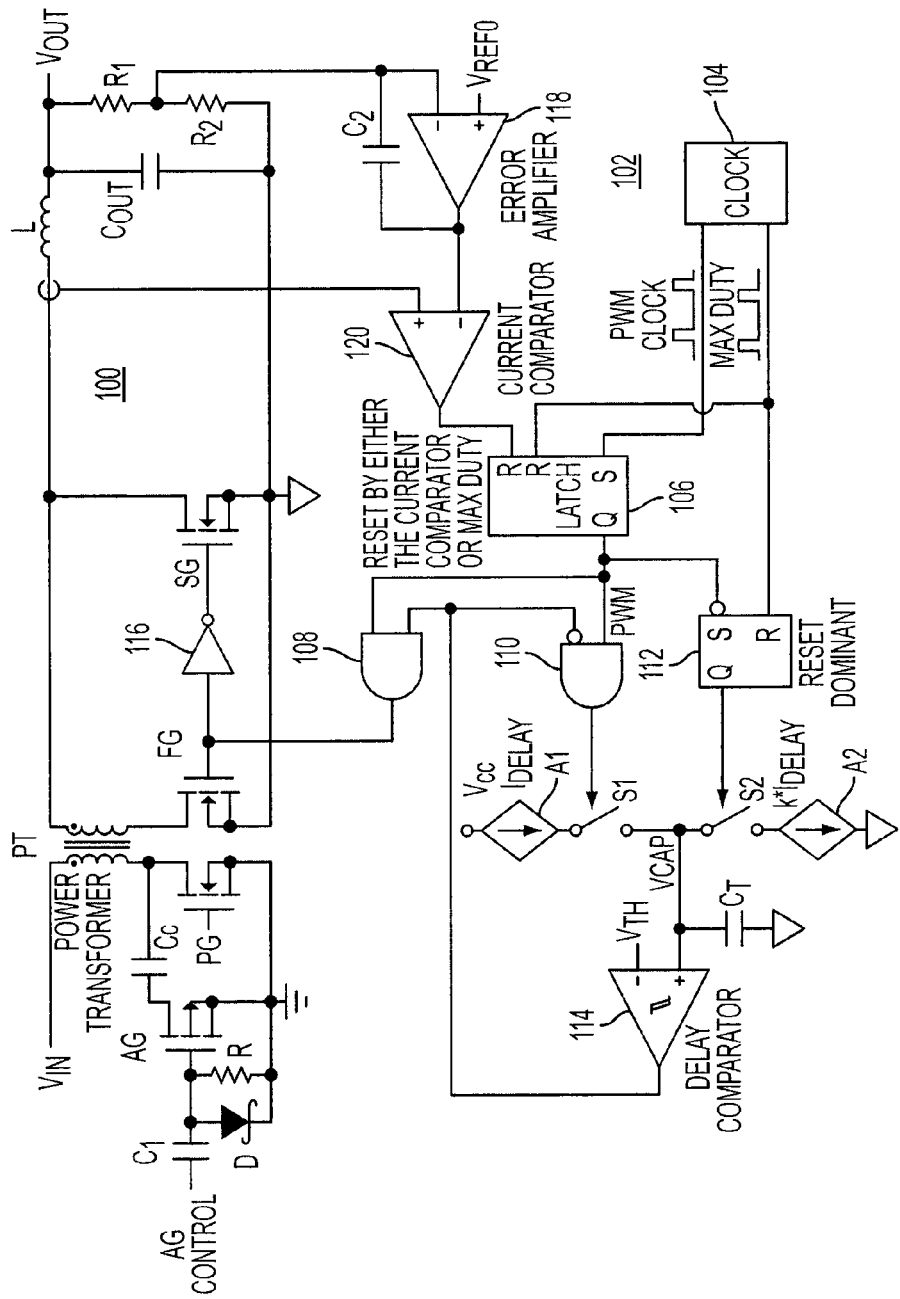
FIG. 6 is a circuit diagram illustrating an exemplary embodiment of the FG delay control circuitry in accordance with the present disclosure.

In particular, FIG. 6 shows an exemplary embodiment of a system that controls a DC/DC forward converter 100 with active clamp reset so as to reduce the FG delay as the PWM on-time $t_{ON}$ approaches the PWM maximum on-time value $t_{MAX}$. The DC/DC forward converter 100 converts an input voltage Vin into an output voltage Vout that may be higher or lower than the input voltage Vin. The converter 100 includes a power transformer PT having primary and secondary windings. A primary gate PG and an active clamp gate AG are coupled to the primary winding of the transformer PT. A forward gate FG and a synchronous gate SG are coupled to the secondary winding of the transformer PT. The AG, FG and SG may be N-type MOSFETs, whereas the AG may be a P-type MOSFET. The converter 100 further includes a clamp capacitor $C_C$ arranged on the primary side of the transformer PT, and an inductor L and an output capacitor $C_{OUT}$ coupled on the secondary side of the transformer PT. A level shift required for controlling a p-type MOSFET of the AG is provided using a level shift circuit including a capacitor $C_1$, a Schottky diode D and a resistor R.

An exemplary converter control circuit 102 in FIG. 6 controls the converter 100 in a peak current control mode. However, as one skilled in the art would realize, the technique for extending achievable duty cycle of the present disclosure is applicable to any converter control mode. The converter control circuit 102 includes a clock 104 that produces a PWM clock which determines when the power transfer cycle should start. Also, the clock 104 produces a maximum duty cycle signal MAX DUTY which determines the maximum on-time value $t_{MAX}$. For example, the maximum duty cycle signal may set the maximum on-time $t_{MAX}$ at about 70% of the converter period.

On the rising edge of the PWM clock, an RS latch 106 is set. As a result, the PWM control signal produced at the output of the latch 106 goes high. The output of the latch 106 is coupled to inputs of AND gates 108 and 110, and via an inverter to the S input of a reset dominant latch 112. The output of the AND gate 110 controls a switch S1 coupled to a current source A1. The output of the latch 112 controls a switch S2 coupled to a current source A2. The current source A1 produces the $I_{DELAY}$ current that may correspond to the current defining the user-programmable delay time $t_{DELAY}$. The current source A2 produces the current of the k*$I_{DELAY}$ value, where k is a constant that may be selected, for example, in the range from 0.9 to 1.1. A timing capacitor $C_T$ is coupled via the switches S1 and S2 to the current sources A1 and A2, respectively. A delay comparator 114 is provided to compare the voltage at the VCAP node with a threshold voltage $V_{TH}$ that may be selected based on circuit considerations to support adequate switching of the gates in the converter 100. The comparator 114 may be a hysteresis comparator.

When the output of the delay comparator 114 is low the switch 51 is turned on, through the AND gate 110, and the delay current $I_{DELAY}$ from the current source A1 is transferred to the timing capacitor $C_T$. The value of the delay current $I_{DELAY}$ may be programmable using the delay resistor $R_{DELAY}$ (shown in FIG. 5) to define a desired delay for the FG turn on.

The current source A1 creates a linear voltage ramp on the capacitor $C_T$, which increases until the VCAP voltage reaches the threshold value $V_{TH}$, at which time the delay comparator 114 trips and performs two functions. First, it turns off the switch S1 through the AND gate 110. Second, it allows the output of the AND gate 108 to go high provided that the PWM signal is still at a high level. Thus, the FG controlled by the output signal of the AND gate 108 is turned on and, via an inverter 116, the SG is turned off by a delayed PWM signal.

At this time, provided that the PG is also ON, power is transferred from the input Vin to the output Vout. The voltage across the power transformer PT causes the current in the inductor L to linearly increase. An error amplifier 118 is coupled to the output Vout via a resistor divider composed of resistors $R_1$ and $R_2$ to compare a voltage representing the output current of the converter 100 with a reference voltage $VREF_0$. The capacitor $C_2$ is coupled to the error amplifier 118 to provide signal integration. An error signal produced at the output of the error amplifier 118 is supplied to a current comparator 120 that compares the error signal with the inductor current.

When the inductor current reaches a threshold determined by the error signal, the current comparator 120 trips. The output of the comparator 120 resets the latch 106 and causes the PWM signal at the output of the latch 106 to go low. When the PWM signal goes low, the RS latch 112 is set and its output Q goes high. This turns on the switch S2 which linearly discharges the voltage VCAP on the capacitor $C_T$. The latch 112 is reset on the rising edge of the MAX DUTY signal produced by the clock 104. Any residual voltage $V_{RES}$ remaining on the capacitor $C_T$ translates into a time value that is subtracted from the delay time in the next cycle when the PWM clock goes high.

Figure 7:
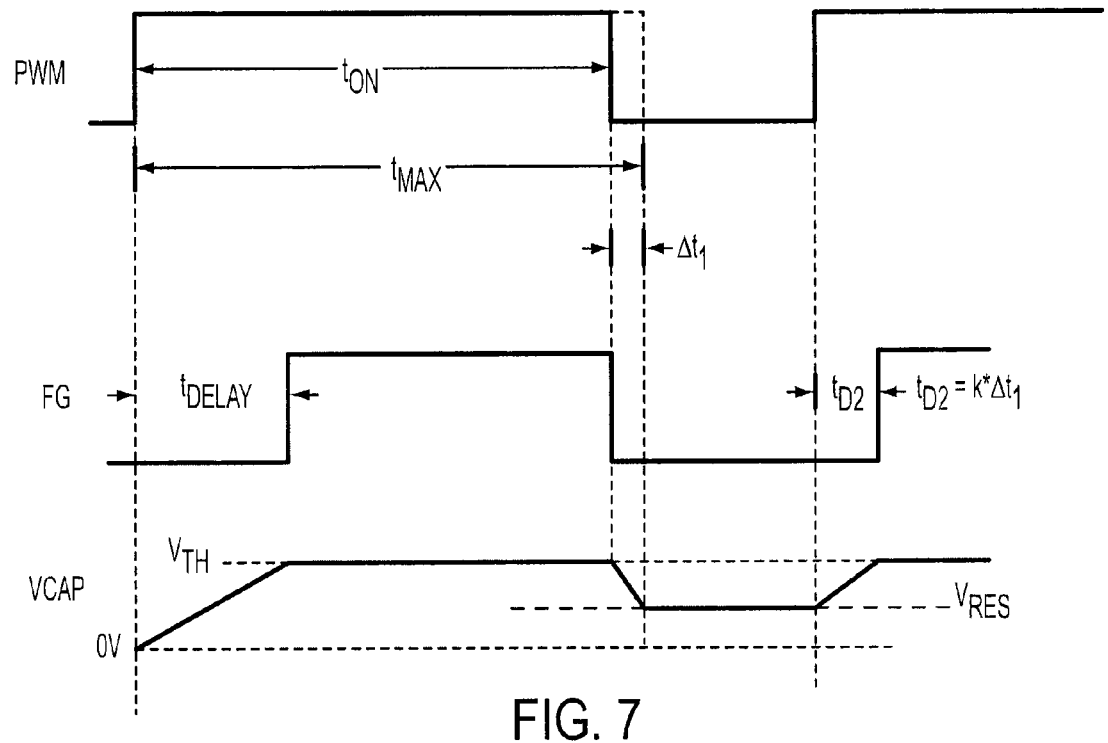
FIG. 7 shows timing diagrams illustrating the FG delay control in accordance with the present disclosure.

Accordingly, as illustrated in FIG. 7, in the initial charge phase when the timing capacitor $C_T$ is fully discharged, switch S1 closes at the PWM signal rising edge, and the current $I_{DELAY}$ from the current source A1 causes a linear voltage ramp of the VCAP voltage from 0V to a threshold voltage $V_{TH}$. When the VCAP voltage reaches the threshold value $V_{TH}$, the delay comparator 114 trips. The time that it takes to ramp the capacitor voltage VCAP from 0V to the threshold value $V_{TH}$ corresponds to the user-programmed delay time $t_{DELAY}$. The logic turns on the gate FG and opens the switch S1. At this time, both switches S1 and S2 are open, and VCAP=$V_{TH}$.

In the discharge phase, the switch S2 closes when the PWM signal goes low (at $t_{ON}$), and opens when the maximum duty cycle is reached (at $t_{MAX}$). When the S2 is closed, current source A2 pulls off the current equal to $k*I_{DELAY}$ of the capacitor $C_T$, which linearly decreases the VCAP voltage. When the maximum duty cycle is reached, S2 opens.

At this time, VCAP=$V_{TH}-[k*I_{DELAY}/C_T*(t_{MAX}-t_{ON})]$. Both switches remain open until the next charge cycle. The VCAP voltage is limited to 0V on the discharge cycle. If $t_{ON}$ is close to $t_{MAX}$, then a residual voltage $V_{RES}$ having a value between 0V and $V_{TH}$ will be left on the capacitor $C_T$.

In the next converter cycle defined by the rising edge of the PWM clock, if $t_{ON}$ was close to $t_{MAX}$ in the previous cycle, there is a residual voltage $V_{RES}$ left on the capacitor $C_T$ equal to $V_{TH}-[k*I_{DELAY}/C_T*(t_{MAX}-t_{ON})]$. When the switch S1 is closed again, current is sourced into the capacitor $C_T$. The time during which the VCAP voltage ramps from the level of $V_{TH}-[k*I_{DELAY}/C_T*(t_{MAX}-t_{ON})]$ to the $V_{TH}$ level is equal to $k*(t_{MAX}-t_{ON})$. Therefore, the FG delay $t_{D2}$ for the new cycle is $k*(t_{MAX}-t_{ON})$.

Hence, as illustrated in FIG. 7, when the on-time $t_{ON}$ defined by the PWM signal at the output of the latch 106 approaches the maximum on-time $t_{MAX}$ defined by the max duty signal, the difference $\Delta t_1$ between the $t_{MAX}$ and $t_{ON}$ corresponds to a time interval determined by the fall of the capacitor voltage VCAP from the $V_{TH}$ level to the $V_{RES}$ level, i.e. until the maximum on-time $t_{MAX}$ is reached. As a result, the FG delay time $t_{D2}$ in the next cycle of the converter is determined by a time interval defined by the rise of the VCAP voltage from the $V_{RES}$ level to the $V_{TH}$ level, which is less than the initial FG delay time $t_{DELAY}$ defined by the rise of the VCAP from 0V to the $V_{TH}$ level.

Figure 8:
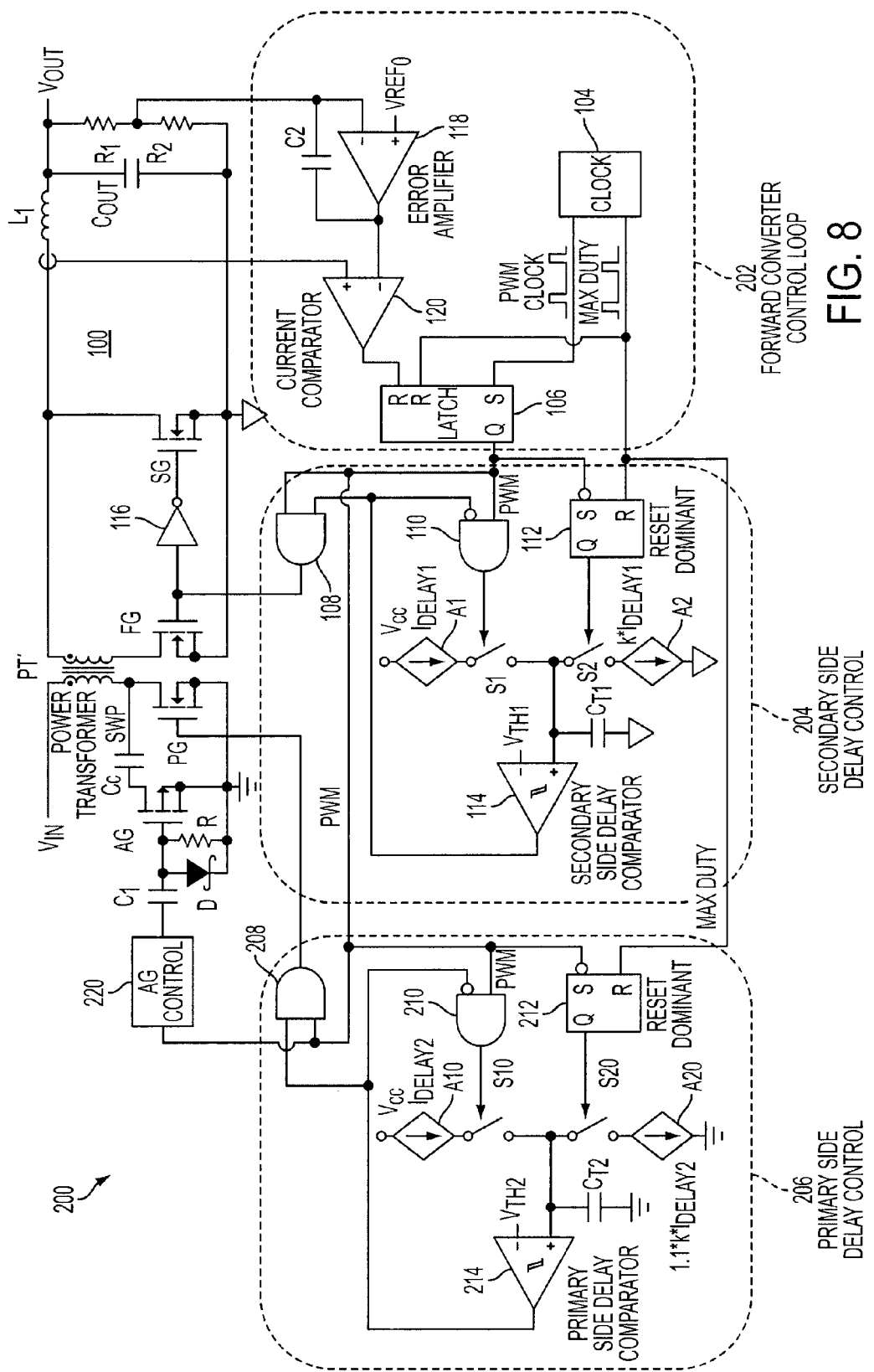
FIG. 8 is a circuit diagram illustrating an exemplary embodiment of the FG and PG delay control circuitry in accordance with the present disclosure.

FIG. 8 illustrates an exemplary embodiment of a system 200 for controlling a DC/DC forward converter 100 with active clamp reset so as to reduce the PG delay in addition to the FG delay. The converter control system 200 includes a forward converter control loop 202, a secondary side delay control circuit 204 and a primary side delay control circuit 206. The forward converter control loop 202 includes the clock 104, the latch 106, the error amplifier 118 with the capacitor C2, and the current comparator 120. These elements are similar to the respective elements in FIG. 6 and operate in a similar manner.

The secondary side delay control circuit 204 include the AND gates 108 and 110, the reset dominant latch 112, the delay comparator 114, timing capacitor $C_{T1}$, switches S1 and S2, and current sources A1 and A2 that produce currents $I_{DELAY1}$ and $k*I_{DELAY1}$, respectively. These elements are similar to the respective elements in FIG. 6 and operate in a similar manner.

The primary side delay control circuit 206 is provided to control the PG delay in a manner similar to controlling the FG delay discussed in connection with the circuit in FIG. 6. The primary side delay control circuit 206 includes AND gates 208 and 210, a reset dominant latch 212, a delay comparator 214, a timing capacitor $C_{T2}$, switches S10 and S20, and current sources A10 and A20 that produce currents $I_{DELAY2}$ and $1.1*k*I_{DELAY2}$, respectively. The primary gate PG is controlled by a signal at the output of the AND gate 208. Also, when the PWM signal at the output of the latch 106 goes high, this signal via an AG control circuit 220 turns off the active clamp gate AG.

The elements in the primary side delay control circuit 206 are similar to the respective elements in the secondary side delay control circuit 204 and operate in a similar manner. However, as previously mentioned, the primary gate PG must turn on after the forward gate FG turns ON. Therefore, the current value $1.1*k*I_{DELAY2}$ produced by the current source A20 for discharging the primary side timing capacitor $C_{T2}$ is larger than the discharging current $k*I_{DELAY1}$ in the secondary side delay control circuit 204 to ensure that the PG turn-on delay is always longer than the FG turn-on delay when $t_{on}$ is close to $t_{MAX}$. The value of the delay current $I_{DELAY2}$ in the primary side delay control circuit 206 may be equal to the value of the delay current $I_{DELAY1}$ in the secondary side control circuit 204. Alternatively, the PG and FG delay control may be provided using different values $I_{DELAY1}$ and $I_{DELAY2}$. Further, the threshold voltage $V_{TH1}$ applied in the secondary side delay control circuit 204 may be equal to threshold voltage $V_{TH2}$ the primary side delay control circuit 206. Alternatively, the PG and FG delay control may be provided using different threshold values $V_{TH1}$ and $V_{TH2}$.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. For example, the present disclosure is applicable to a DC/DC forward converter with active clamp reset, where the converter is provided with primary side control instead of secondary side control. Such a converter may include a primary gate PG, an active clamp gate AG, and diodes provided on the secondary side of the transformer PT in place of the forward gate FG and the synchronous gate SG.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for controlling a DC/DC forward converter having a transformer with primary and secondary windings, a reset switch, and a first switch coupled to the primary winding of the transformer, the system comprising:
  a PWM control circuit responsive to an output signal of the converter for producing a PWM signal to control switching of the reset switch and the first switch,
    a period of the PWM signal including an on-time interval for enabling transfer of power via the transformer when the first switch is on, and a reset time interval for enabling reset of the transformer when the reset switch is on,
    a maximum value of the on-time interval being pre-set to provide sufficient time for the reset,
    the reset switch being turned off when the PWM signal goes from a first level to a second level,
    a first delay period being set between time when the reset switch turns off and time when the first switch turns on; and
  a first delay control circuit for reducing the first delay period when the on-time interval approaches the maximum value.

2. The system of claim 1, further comprising a second switch coupled to the secondary winding of the transformer, wherein a second delay period shorter than the first delay period being set between time when the reset switch turns off and time when the second switch turns on, the system further comprising a second delay control circuit for reducing the second delay period when the on-time interval approaches the maximum value.

3. The system of claim 2, wherein the first delay control circuit is configured to determine a difference $\Delta t$ between duration of the on-time interval and the maximum value of the on-time interval, and to reduce the first delay period to a value of $(m \times \Delta t)$ if the value of $(m \times \Delta t)$ is less the first delay period, where m is a constant value selected to provide stability of converter operations.

4. The system of claim 3, wherein the second delay control circuit is configured to determine the difference $\Delta t$ between duration of the on-time interval and the maximum value of the on-time interval, and to reduce the second delay period to a value of $(k \times \Delta t)$, if the value of $(k \times \Delta t)$ is less than the second delay period, where k is a constant value selected to provide stability of converter operations, and m exceeds k.

5. The system of claim 2, wherein the first delay control circuit includes a first timing capacitor, a first current source for producing a first value of current representing the first delay period, and a second current source for producing a second value of current proportional to the first value.

6. The system of claim 5, wherein the first timing capacitor being coupled to the first and second current sources so as to being charged with current of the first value and discharged with current of the second value.

7. The system of claim 6, wherein the first delay control circuit further includes a comparator for comparing voltage at the first timing capacitor with a threshold value to control charging of the first timing capacitor.

8. The system of claim 7, wherein the first timing capacitor is disconnected from the first current source when the voltage at the first timing capacitor reaches the threshold value.

9. The system of claim 8, wherein the first timing capacitor is connected to the first current source for charging when the PWM signal goes to the second level.

10. The system of claim 9, wherein the first timing capacitor is connected to the second current source for discharging when the PWM signal goes to the first level.

11. The system of claim 10, wherein the first timing capacitor is disconnected from the second current source in response to the maximum value of the on-time interval.

12. The system of claim 5, wherein the second delay control circuit includes a second timing capacitor, a third current source for producing a third value of current representing the second delay period, and a fourth current source for producing a fourth value of current proportional to the third value, the fourth value is higher than the second value.

13. The system of claim 12, wherein the second timing capacitor being coupled to the third and fourth current sources so as to being charged with current of the third value and discharged with current of the fourth value.

14. A method of extending a duty cycle range in a DC/DC forward converter having a transformer with primary and secondary windings, a reset switch, and a first switch coupled to the primary winding of the transformer, the method comprising the steps of:
  based on an output signal of the converter, producing a PWM signal to control switching of the reset switch and the first switch;
    a period of the PWM signal including an on-time interval for enabling transfer of power via the transformer when the first switch is on, and a reset time interval for enabling reset of the transformer when the reset switch is on,
    a maximum value of the on-time interval being pre-set to provide sufficient time for the reset,
    the reset switch being turned off when the PWM signal goes from a first level to a second level,
    a first delay period being set to delay turn-on of the first switch after the reset switch turns off, thereby reducing a duty cycle of the converter; and
  reducing the first delay time when the on-time interval approaches the maximum value, so as to extend the duty cycle.

15. The method of claim 14, wherein the converter further includes a second switch coupled to the secondary winding of the transformer, and a second delay period shorter than the first delay period being set to delay turn-on of the second switch after the reset switch turns off, the method further comprising a step of reducing the second delay time when the on-time interval approaches the maximum value, so as to further extend the duty cycle.

16. The method of claim 15, wherein the step of reducing the first delay period comprises:

in a first switching cycle of the converter, determining a difference Δt between duration of the on-time interval and the maximum value of the on-time interval, and in a second switching cycle of the converter carried out after the first switching cycle, reducing the first delay period to a value of (m×Δt) if the value of (m×Δt) is less than the first delay period, where m is a constant value selected to provide stability of converter operations.

17. The method of claim 16, wherein the step of reducing the second delay period comprises:

in a first switching cycle of the converter, determining the difference Δt between duration of the on-time interval and the maximum value of the on-time interval, and in a second switching cycle of the converter carried out after the first switching cycle, reducing the second delay period to a value of (k×Δt), if the value of (k×Δt) is less than the second delay period, where k is a constant value selected to provide stability of converter operations, and m exceeds k.

* * * * *